Dec. 16, 1941.    H. L. LARSON    2,266,220
CARRYING BRACKET FOR MOTOR VEHICLES
Filed June 20, 1940    2 Sheets-Sheet 1
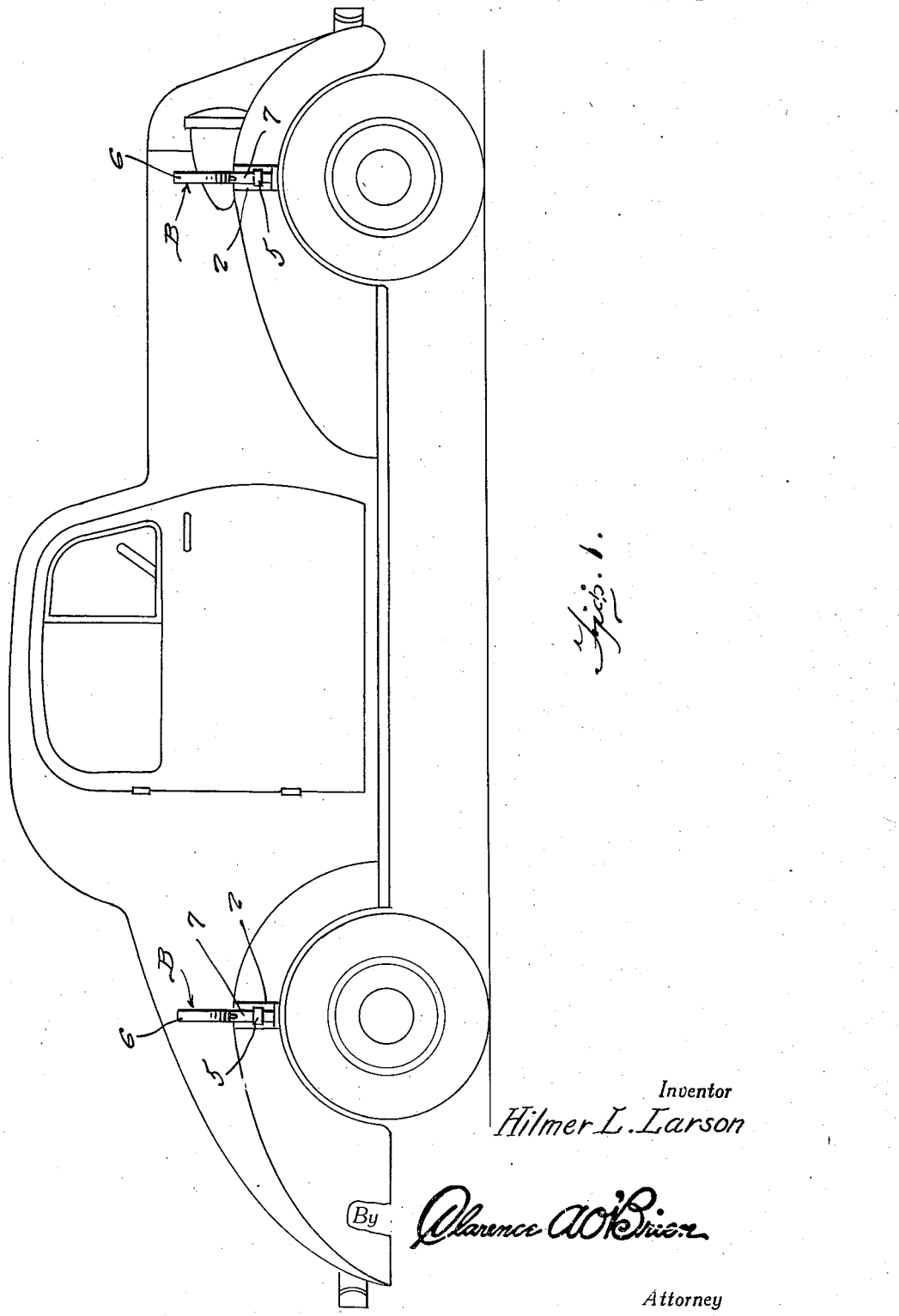
Inventor
Hilmer L. Larson
By Clarence A. O'Brien
Attorney Dec. 16, 1941.  H. L. LARSON  2,266,220
CARRYING BRACKET FOR MOTOR VEHICLES
Filed June 20, 1940  2 Sheets-Sheet 2
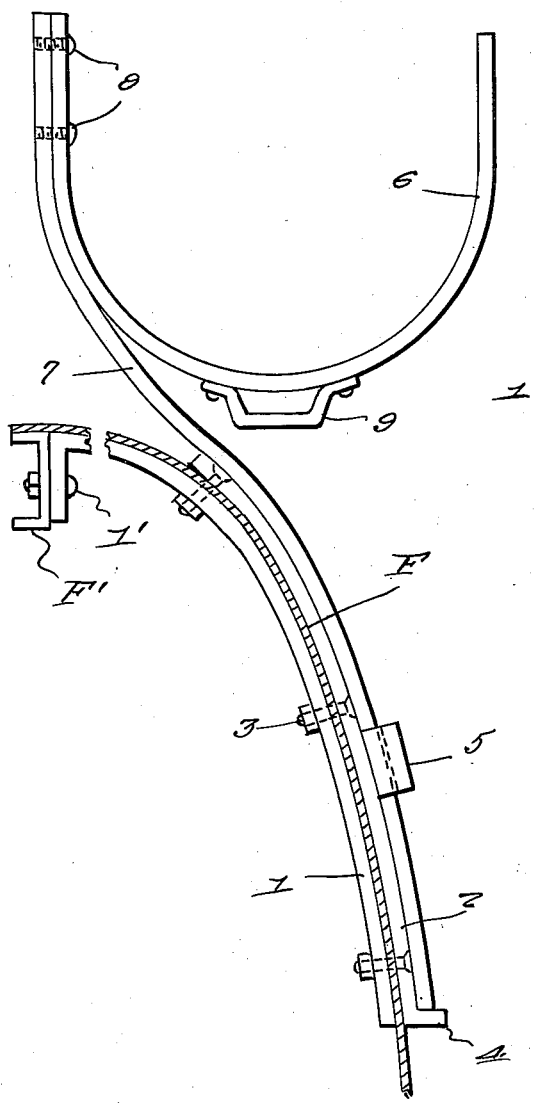
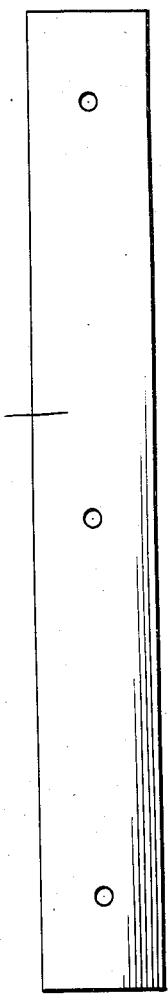
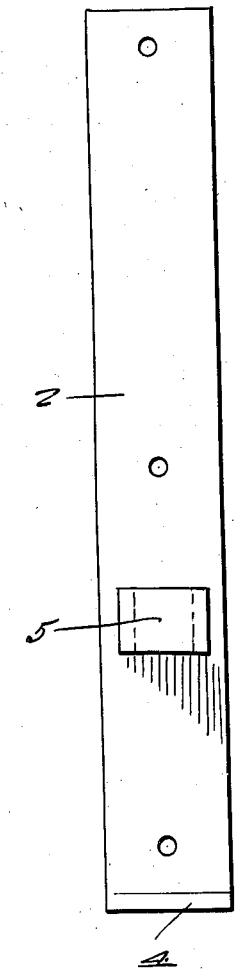
Inventor
Hilmer L. Larson
By Clarence A. O'Brien
Attorney Patented Dec. 16, 1941

2,266,220

UNITED STATES PATENT OFFICE 2,266,220

CARRYING BRACKET FOR MOTOR VEHICLES

Hilmer L. Larson, Millwood, N. Y.

Application June 20, 1940, Serial No. 341,571

1 Claim. (Cl. 224—29)

This invention relates to carrying brackets for motor vehicles, the general object of the invention being to provide means for supporting pipes, ladders and other objects from the fenders of a motor vehicle, with means for removably holding the supporting parts on the fenders so that they can be removed when not in use.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is an elevational view of an automobile supplied with the invention.

Figure 2 is a sectional view through a fender of an automobile with the invention applied thereto.

Figure 3 is a view of the plate to be connected to the underside of a fender.

Figure 4 is a view of the plate to be connected to the outside of the fender.

As shown in these views I provide supporting brackets B for the rear and front fenders of an automobile or motor vehicle so that long objects such as pipes, ladders, etc., can be carried by the automobile by placing the object in these brackets.

Each bracket is held in place by an elongated plate 1 which is curved to conform to the curvature of the fender F with its front end turned to abut a part of the frame F' of the automobile with this end fastened to the frame part as shown at 1'. A second plate 2 is curved to conform to the top part of the fender and the two plates are fastened together with the fender between them by the bolts 3. The lower end of the outer plate 2 is formed with an outwardly extending lip 4 and a loop forming member 5 is fastened to the plate 2. Each bracket is of substantially U-shape as shown at 6 and has one limb fastened to the top part of a plate 7 by the screws 8. This plate extends downwardly alongside the limb of the bracket 6 and then turned and passes downwardly against the plate 2 with a part thereof passing through the loop 5 with its lower end engaging the lip 4. Thus the plate 7 can be pulled from the loop 5 so that the bracket and the plate 7 can be removed when not in use. The loop forming member 9 is fastened to the underside of the member 6 so that a strap, cable or the like can be passed therethrough and then over the object passing through the bracket 6 to fasten the object in the bracket.

Of course, the supporting means for the rear fender are substantially like those shown in Figures 2, 3 and 4, excepting that the plates must conform to the shape of that part of the rear fender to which they are connected.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

Carrying brackets for the fenders of a motor vehicle comprising vertically arranged elongated plates fastened to the outer faces of the front and rear fenders at one side of the vehicle, each plate having an outwardly extending horizontally arranged lip at its lower end and a loop forming strap projecting from the outer face of each plate intermediate the ends thereof, a vertically arranged bar supported by each plate, each bar having its lower portion of curve construction to contact the outer face of each plate with a part of the bar passing through the loop forming strap with its lower end resting against the lip, the upper part of the bar curving inwardly and upwardly and terminating in a straight vertically arranged portion and a U-shaped member carried by the upper part of each bar, each U-shaped member having the outer face of one limb contacting the upper portion of the bar and means for fastening the upper portion of said limb to the straight part of the bar.

HILMER L. LARSON.